US012663598B2

(12) United States Patent
Orsi et al.

(10) Patent No.: US 12,663,598 B2
(45) Date of Patent: Jun. 23, 2026

(54) HEAT DISSIPATER ASSEMBLY

(71) Applicant: Telefonaktiebolaget LM Ericsson (publ), Stockholm (SE)

(72) Inventors: Stefano Orsi, Genoa (IT); Claudio D'Incà, Genoa (IT); Paolo Debenedetti, Genoa (IT); Sergio Mosti, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 427 days.

(21) Appl. No.: 18/252,266

(22) PCT Filed: Nov. 9, 2022

(86) PCT No.: PCT/EP2022/081239
§ 371 (c)(1),
(2) Date: May 9, 2023

(87) PCT Pub. No.: WO2023/110226
PCT Pub. Date: Jun. 22, 2023

(65) Prior Publication Data
US 2024/0369784 A1     Nov. 7, 2024

Related U.S. Application Data

(60) Provisional application No. 63/290,116, filed on Dec. 16, 2021.

(51) Int. Cl.
*G02B 6/42* (2006.01)

(52) U.S. Cl.
CPC ......... *G02B 6/4269* (2013.01); *G02B 6/4278* (2013.01); *G02B 6/4251* (2013.01); *G02B 6/4277* (2013.01); *G02B 6/4279* (2013.01)

(58) Field of Classification Search
None
See application file for complete search history.

(56) References Cited

U.S. PATENT DOCUMENTS 7,513,698 B2     4/2009   Andersson
10,219,412 B1 *   2/2019   Betz .................... G02B 6/4246
(Continued)

FOREIGN PATENT DOCUMENTS

DE      102016100514 A1     7/2016
EP          3203283 B1     7/2020
(Continued)

OTHER PUBLICATIONS

International Search Report and Written Opinion dated Feb. 7, 2023 for International Application No. PCT/EP2022/081239 filed Nov. 9, 2022, consisting of 14-pages.
(Continued)

*Primary Examiner* — Jerry Rahll
(74) *Attorney, Agent, or Firm* — Weisberg I.P. Law, P.A.

(57)     ABSTRACT

A heat dissipater assembly for an optical module for a telecommunications unit. The heat dissipater assembly includes a heat dissipater, a first connector portion coupled to the dissipater body and a second connector portion coupled to the dissipater body. The heat dissipater has a dissipater body including a recess for receiving the optical module, such that the optical module is in thermal communication with the dissipater body, and one or more heat dissipation structures configured to dissipate heat from the optical module into an environment around the heat dissipater. The optical connector is optically connected to the optical module received within the recess. The second connector portion is configured to be coupled to the telecommunications unit. The heat dissipater assembly further
(Continued)

includes an electrical extender. The electrical extender is configured to be partially received within the heat dissipater.

26 Claims, 8 Drawing Sheets

(56) References Cited

U.S. PATENT DOCUMENTS

| | | | |
|---|---|---|---|
| 2010/0284152 A1* | 11/2010 | Harris | G02B 6/4266 |
| | | | 361/737 |
| 2014/0321061 A1* | 10/2014 | Moore | B32B 27/281 |
| | | | 361/709 |
| 2016/0128085 A1 | 5/2016 | Liu et al. | |
| 2019/0116692 A1* | 4/2019 | Little | H05K 7/20336 |
| 2021/0239918 A1 | 8/2021 | LeFebvre et al. | |
| 2022/0283054 A1 | 9/2022 | Iwasaki | |
| 2023/0018654 A1 | 1/2023 | Winzer et al. | |
| 2023/0379075 A1 | 11/2023 | Thyni et al. | |

FOREIGN PATENT DOCUMENTS

| | | |
|---|---|---|
| EP | 3986011 A1 | 4/2022 |
| EP | 2770655 A1 | 8/2024 |

OTHER PUBLICATIONS

International Search Report and Written Opinion dated Jan. 23, 2024 for International Application No. PCT/EP2023/065018 filed Jun. 5, 2023, consisting of 15-pages.

Camps-Mur et al. "5G-XHaul: A Novel Wireless-OpticalND Transport Network to Support Joint 5G Backhaul and Fronthaul Services" IEEE Communications Magazine; Jul. 2019, consisting of 7 pages.

International Search Report and Written Opinion dated Mar. 7, 2024 issued in PCT Application No. PCT/EP2023/084097, filed Dec. 4, 2023, consisting of 10 pages.

* cited by examiner

Fig. 1

-- PRIOR ART--

HEAT DISSIPATER ASSEMBLY

CROSS-REFERENCE TO RELATED APPLICATIONS

This application is a Submission Under 35 U.S.C. § 371 for U.S. National Stage Patent Application of International Application No.: PCT/EP2022/081239, filed Nov. 9, 2022 entitled "HEAT DISSIPATER ASSEMBLY," which claims priority to U.S. Provisional Application No. 63/290,116, filed Dec. 16, 2021, the entireties of both of which are incorporated herein by reference.

TECHNICAL FIELD

The present disclosure relates to a heat dissipater assembly and is particularly, although not exclusively, concerned with a heat dissipater assembly configured to improve dissipation of heat from an optical module for a telecommunications unit, such as a radio unit. The present disclosure also relates to a heat dissipater for the heat dissipater assembly and a system comprising a telecommunications unit and one or more heat dissipater assemblies.

BACKGROUND

With reference to FIG. 1, a radio unit 2, e.g. a Remote Radio Unit (RRU), may be installed at a remote site 4 and a baseband or hub unit 6 may be installed at a hub site 8. The radio unit 2 and the baseband unit 6 can be equipped with grey, e.g. single channel, or Wavelength Division Multiplexing (WDM) optical modules, such as pluggable optical modules.

As illustrated in FIG. 1, a multiplexor/de-multiplexor unit 10 may be provided at either end of a link 12 extending between the hub site 8 and the remote site 4. Optical cables 14, such as LC-LC optical cables, may be used to connect optical modules of the radio unit 2 and baseband unit 6 to the respective multiplexor/de-multiplexor units 10 or to the link 12 itself, e.g. when no multiplexor/de-multiplexor is present. The optical cables 14 may comprise standard optical connectors, such as AXS™ connectors or OTIS (Optical Transpose Interconnection Systems) connectors for connecting to the radio unit 2.

Remote radio units, such as the radio unit 2, are often deployed in outdoor scenarios, such as mounted on poles, or at the top of buildings or towers. In such scenarios, the remote radio units can be exposed to weather and outdoor environmental conditions. For this reason, the remote radio units 2 are typically installed within enclosures designed to protect the remote radio units 2 against the weather and environmental conditions they may experience. For example, the enclosures may be designs to IP (Ingress Protection) 65 standards or greater. In some situations, such enclosures are camouflaged to respect the local rules for deployment in urban environments.

When the remote radio unit 2 is installed within such an enclosure, the internal temperature of the remote radio unit 2 can reach high temperatures. For example, the remote radio unit 2 may reach a temperature above 85 degrees Celsius. In particular, such internal temperatures can be reached when the remote radio unit 2 is installed within enclosure in an environment where the temperature can reach or exceed 50 degrees Celsius, even for short periods.

Normally, the radio units to be installed within such enclosures are designed to be fan-less. However, even when a fan is present, the optical modules, e.g. pluggable optical modules, installed in the radio unit 2 may not benefit from any airflow. Furthermore, the optical modules are typically positioned close to other high temperature components of the radio units, such as the power supply and its dissipaters, which can further increase the temperature of the optical modules.

Pluggable optical modules and, in particular, pluggable WDM optical modules can be sensitive to circuitry temperature, because temperature can affect the modulation of wavelength by the module. For this reason, most commercially available optical modules are limited to operating in environmental conditions in which the temperature is between −40 and +85 degrees Celsius.

The sensitivity of pluggable optical modules to temperature can limit the possibility of providing pluggable optical modules in radio units in some countries where the ambient temperature can reach or exceed desirable operating temperatures of the radio units, and/or where the regulatory camouflage prevents sufficient passive air circulation around the radio unit.

SUMMARY

According to an aspect of the present disclosure, there is provided a heat dissipater assembly for an optical module, e.g. a plugable optical module, such as an SFP (Small Form Factor pluggable) optical module for a telecommunications unit, such as a radio unit. The heat dissipater assembly comprises: a heat dissipater, wherein the heat dissipater comprises: a dissipater body comprising an recess for receiving the optical module, such that the optical module is in thermal communication with the dissipater body, and one or more heat dissipation structures configured to dissipate heat from the optical module into an environment around the heat dissipater; a first connector portion coupled to the dissipater body, wherein the first connector portion is configured to couple to an optical connector, such that the optical connector is optically connected to the optical module, when the optical module is received within the recess; and a second connector portion coupled to the dissipater body, the second connector portion to be coupled to the telecommunications unit. The heat dissipater assembly further comprises: an electrical extender, wherein the electrical extender is configured to be partially received within the heat dissipater and electrically connect to the optical module, when the optical module is received within the heat dissipater, and wherein the electrical extender is configured to electrically connect to the telecommunications unit when the second connector portion is coupled to the telecommunications unit. The electrical extender may thereby electrically connect the optical module to the telecommunications unit.

Advantageously, use of a heat dissipator assembly according to an embodiment of the present invention can reduce the temperature of the optical module (in comparison to directly plugging the optical module into (inside) the telecommunications unit). Thus, advantageously, the optical module/telecommunications unit may be used in high temperature environments without reducing the performance of the optical module.

A shape of the second connector portion may correspond to a shape of the optical connector connectable to the first connector portion. A part of the electrical extender may protrude from the heat dissipater to electrically connect to the telecommunications unit away from the heat dissipater. The heat dissipater assembly may be configured such that at least a portion of dissipater body is spaced apart from the telecommunications unit when the second connector portion is coupled to the telecommunications unit.

The heat dissipation structures may comprise a plurality of heat dissipation fins arrayed, e.g. regularly or irregularly spaced over an external surface of the dissipater body.

The first connector portion may be at a first end of the dissipater body and the second connector portion may be at a second end of the dissipater body. A longitudinal axis of the dissipater body may extend between the first and second ends. The heat dissipation structures may be arrayed about the longitudinal axis. The heat dissipation structures may be arrayed about the longitudinal axis of the dissipater body through an angle of substantially 360 degrees. Each of the heat dissipation structures may extend principally in a direction with a component parallel with the longitudinal axis of the dissipater body. The dissipater body may be substantially cylindrical.

The dissipater body may be configured to contact the optical module received in the recess, e.g. so as to be in thermal communication with the optical module, at a plurality of locations spaced around the longitudinal axis of the dissipater body through an angle of greater than 90 degrees or greater than 180 degrees, such as substantially 360 degrees. The recess may comprise two or more, such as four, internal walls arranged at angles relative to one another. The two or more internal walls of the recess may correspond in shape to two or more external walls of the optical module to be received within the recess. The dissipater body may be configured to contact the optical module received in the recess at two or more of the internal walls, e.g. so as to be in thermal communication with the optical module at two or more of the internal walls. For example, the recess may comprise 3, 4 or more than 4 internal walls arranged at angles relative to one another, e.g. to define a cross-sectional shape of the recess substantially corresponding to a cross-sectional shape of the optical module to be received within the recess. The recess may be configured such that each of the internal walls of the recess is in contact, e.g. thermal communication, with a corresponding wall of the optical module when the optical module is received within the recess. In this way, heat may be dissipated from the optical module to each of the internal walls of the recess and therefore from each of the corresponding external walls of the optical module.

The second connector portion may comprise one or more engagement features configured to selectively engage one or more complimentary engagement features on the telecommunications unit to resist disconnection of the second connector portion from the telecommunications unit. The one or more engagement features may be formed on a collar movably coupled to a fixed portion of the second connector portion. The collar may be movable relative to the fixed portion in order to engage or disengage the one or more engagement features from the one or more complimentary engagement features.

The second connector portion may comprise a seal configured to engage the telecommunications unit to create a seal against the ingress of water and/or dust between the telecommunications unit and the heat dissipater. The second connector portion may be configured such that engagement of the one or more engagement features with the one or more complementary engagement features acts to resist the seal disengaging from the telecommunications unit. The seal may comprise an electromagnetic interference shielding material.

The electrical extender may comprise a plurality of first contact elements spaced over an external surface of the electrical extender. The first contact elements may be configured to engage the heat dissipater at a plurality of positions around an opening in the heat dissipater in which the electrical extender is received, in order to improve electromagnetic interference shielding at the opening. Additionally or alternatively, the electrical extender may comprise a plurality of second contact elements spaced over an external surface of the electrical extender. The second contact elements may be configured to engage the telecommunications unit at a plurality of positions around an opening in the telecommunications unit in which the electrical extender is received when the second connector portion is coupled to the telecommunications unit, in order to improve electromagnetic interference shielding at the opening in the telecommunications unit.

A shape of a portion of the electrical extender configured to electrically connect to the telecommunications unit may correspond to a shape of a portion of the optical module to be received within the recess. A length of the heat dissipater, e.g. the dissipater body, may be greater than a length of the optical module. The dissipater body may be manufactured from a thermally conductive material, such as a metallic material or thermally conductive plastic material. Alternatively, the recess of the heat dissipater body may be at least partially formed in one or more portions of the heat dissipater body manufactured from a (relatively) thermally insulating material, such as a plastic material, and the heat dissipation structures may comprise a thermally conductive elements, e.g. comprising a (relatively) thermally conductive material, coupled to the one or more portions manufactured from the thermally insulating material.

According to another aspect of the present disclosure, there is provided a heat dissipater for the above-mentioned heat dissipater assembly. The heat dissipater comprises: a dissipater body comprising an recess for receiving the optical module, such that the optical module is in thermal communication with the dissipater body, and one or more heat dissipation structures configured to dissipate heat from the optical module into an environment around the heat dissipater; a first connector portion coupled to the dissipater body, wherein the first connector portion is configured to couple to an optical connector, such that the optical connector is optically connected to the optical module, when the optical module is received within the recess; and a second connector portion coupled to the dissipater body, the second connector portion couplable to a telecommunications unit.

According to another aspect of the present disclosure, there is provided a system comprising: a telecommunications unit; and one or more of the above-mentioned heat dissipater assemblies coupled to the telecommunications unit. The assembly may further comprise one or more optical module respectively received within the recesses of the one or more heat dissipater assemblies.

As mentioned above, the telecommunications unit may be a radio unit. However, the telecommunications unit may any other kind of telecommunications unit such as, but not limited to, a router.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which:

FIG. 1 is a schematic view of a previously proposed communications system;

FIG. 2b is a perspective view of the heat dissipater assembly shown in FIG. 2a;

DETAILED DESCRIPTION

Figure 1:
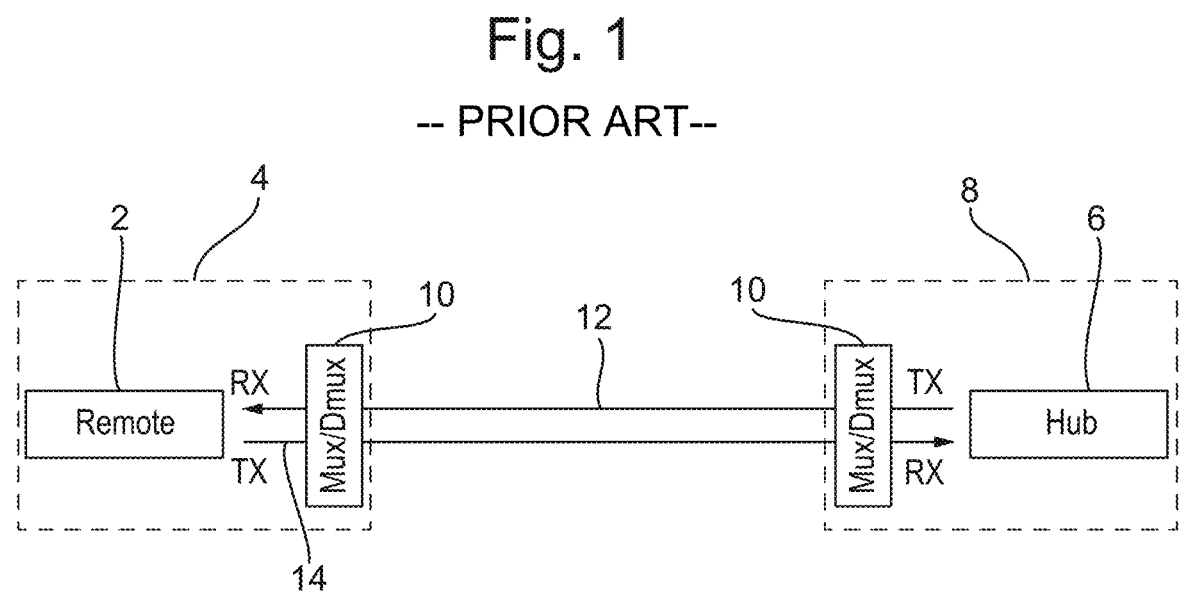
Figure 2A:
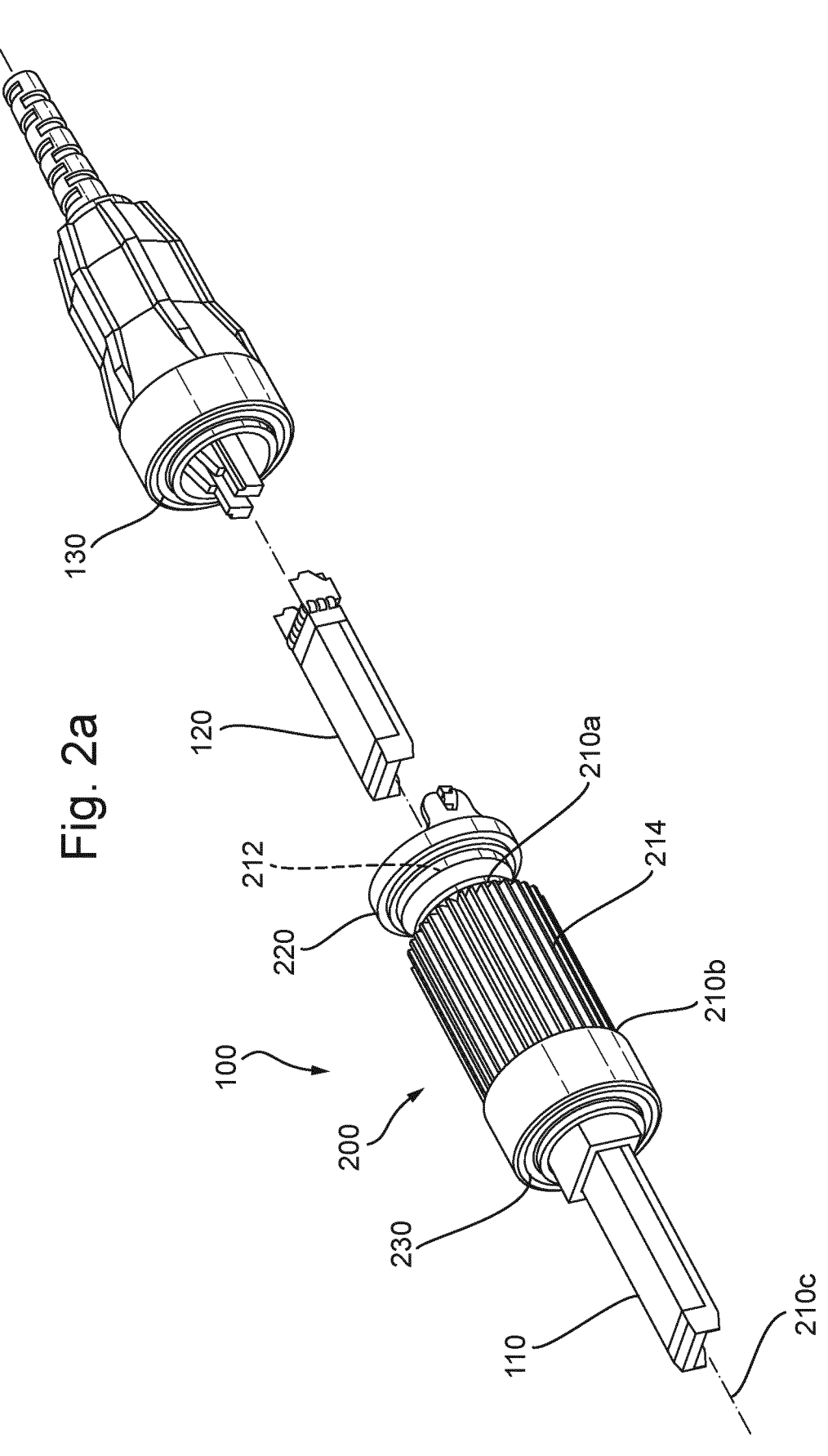
FIG. 2a is a perspective, partially exploded view of a heat dissipater assembly according to arrangements of the present disclosure.
Figure 2B:
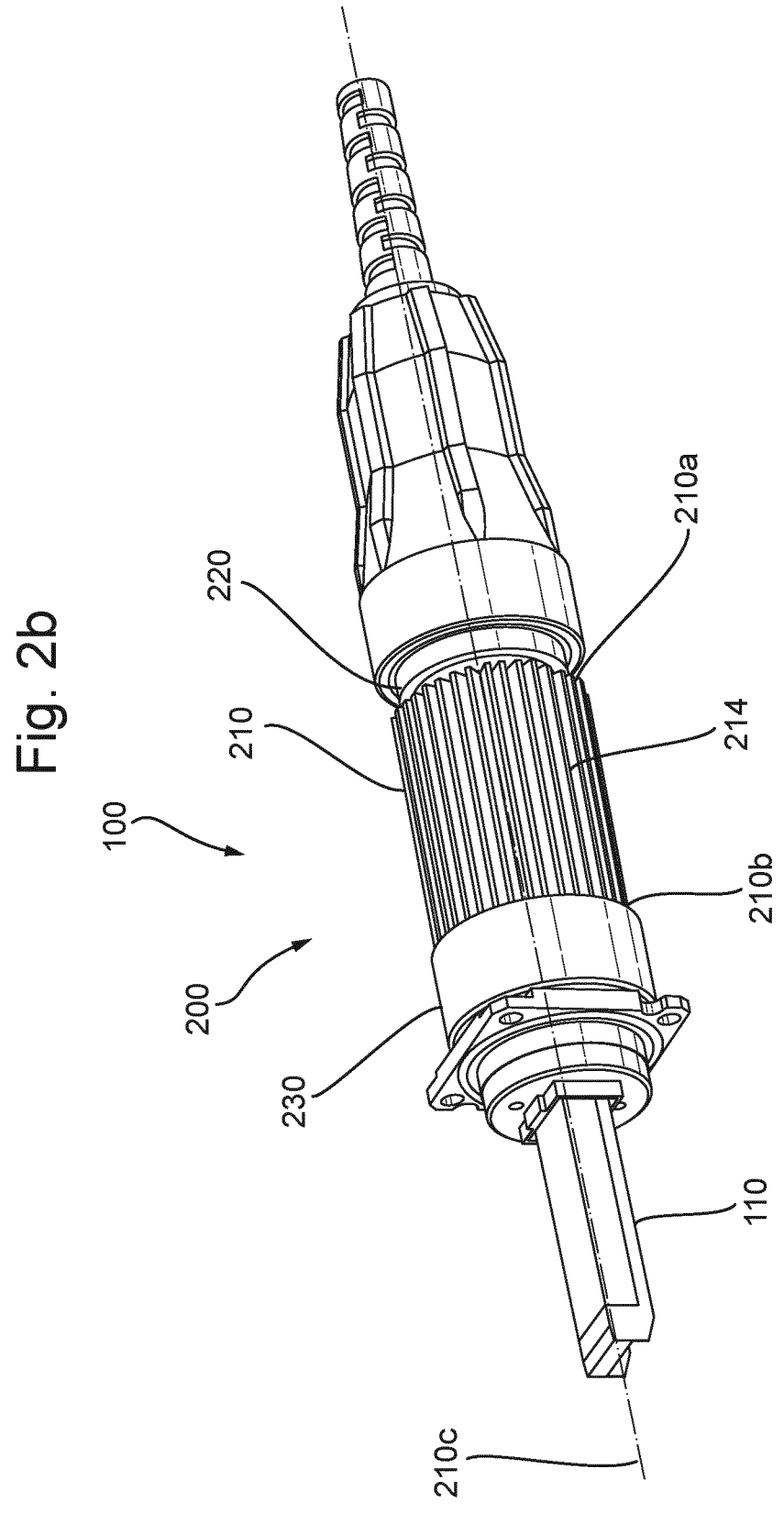

With reference to FIGS. 2a and 2b, collectively referred to as FIG. 2, a heat dissipater assembly 100 for an optical module 120 for a telecommunications unit in the form of a radio unit, such as the remote radio unit 2 illustrated in FIG. 1, will now be described. As described in more detail below, one or more of the heat dissipater assemblies 100 may house respective ones of the optical modules 120 for the radio unit 2 in order to improve dissipation of heat from the optical modules of the radio unit 2.

Whilst in this example the telecommunications unit is a radio unit, it should be appreciated that in other examples the telecommunications unit may a different type of telecommunications unit, for example, a router. The telecommunications unit may be an outdoor active unit. Further, the optical module may be any type of optical module As shown in FIG. 2, the heat dissipater assembly 100 may comprise a heat dissipater 200 and an electrical extender 110. The heat dissipater 200 comprises a dissipater body 210. The dissipater body 210 comprises a recess 212 for receiving the optical module 120, e.g. a pluggable optical module, such as a Small Form-factor Pluggable (SFP) optical module or SFP28 optical module. The dissipater body 210 is configured, e.g. sized and shaped, such that the optical module 120 housed within the recess 212 is in thermal communication with the dissipater body 210. The dissipater body 210 further comprises one or more heat dissipation structures 214 configured to dissipate heat from the optical module 120 into an environment around the heat dissipator 200.

The heat dissipater 200 further comprises a first connector portion 220 and a second connector portion 230. The first and second connector portions 220, 230 are coupled to the dissipater body 210. For example, the first and second connector portions 220, 230 may be integrally formed with the dissipater body 210. As depicted in FIG. 2, the first connector portion 220 may be coupled to the dissipater body 210 at a first end 210a of the dissipater body 210 and the second connector portion 230 may be coupled to a second end 210b of the dissipater body 210 opposite the first end. A longitudinal axis 210c of the dissipater body 210 may extend in a direction between the first and second ends 210a,

210b. The optical module 120 may be insertable into the recess 212 through an opening at the first end of the dissipater body 210, e.g. in the axial end face of the dissipater body 210.

The first connector portion 220 may be configured, e.g. shaped, to couple to an optical connector 130, e.g. a standard optical connector, such as an AXS optical connector or an OTIS optical connector. The heat dissipater 200, e.g. the dissipater body 210 and the first connector portion 220, may be configured such that, when the optical connector 130 is coupled to the first connector portion 220, the optical connecter 130, e.g. a waveguide of the optical connector 130, is optically coupled to the optical module 120 housed within the recess 212 in the dissipater body 210. For example, a configuration of the recess 212 and the first connector portion 220 may correspond to, e.g. be shaped similarly to, a plug/socket and connector of the radio unit 2 for receiving a pluggable optical module, similar to the optical module 120, to be connected to by an optical connector similar to the optical connector 130.

Figure 3:
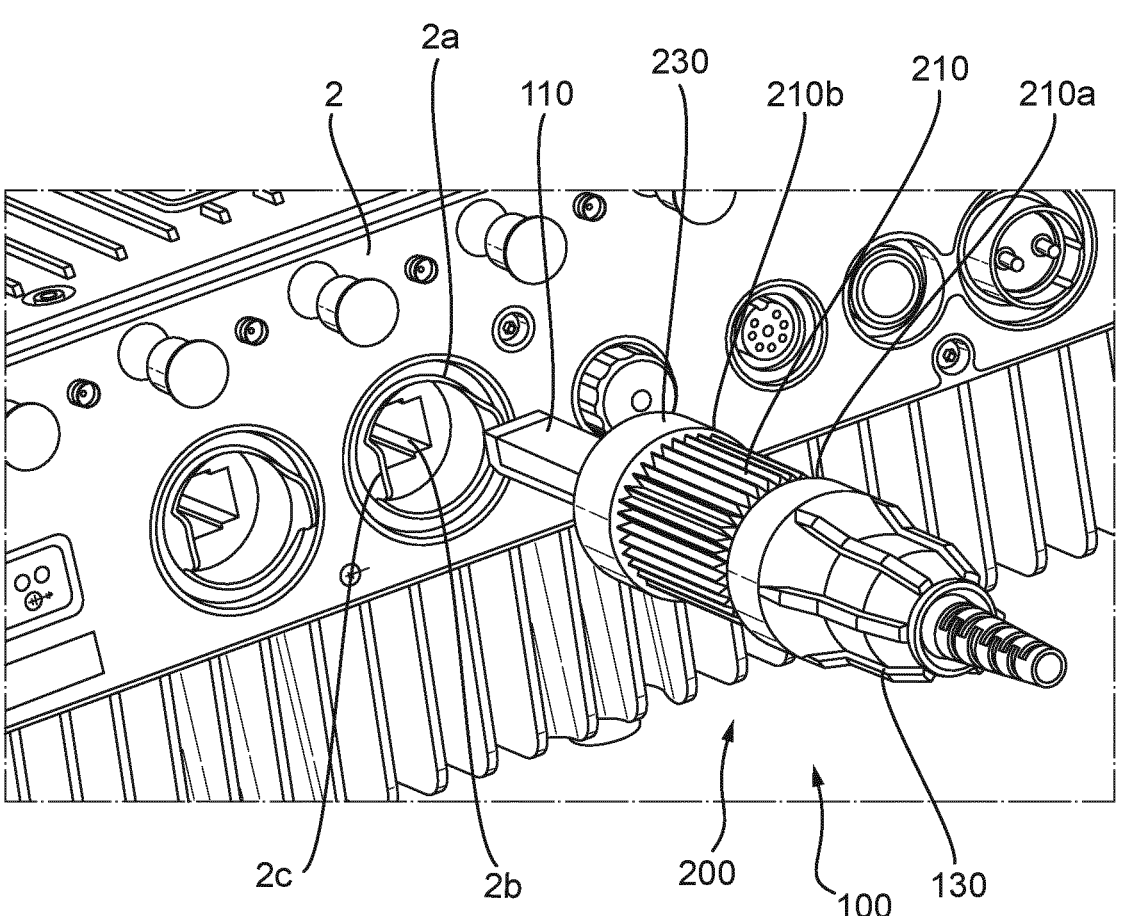
FIG. 3 is a front perspective view of a radio unit and the heat dissipater assembly shown in FIGS. 2a and 2b.
Figure 4:
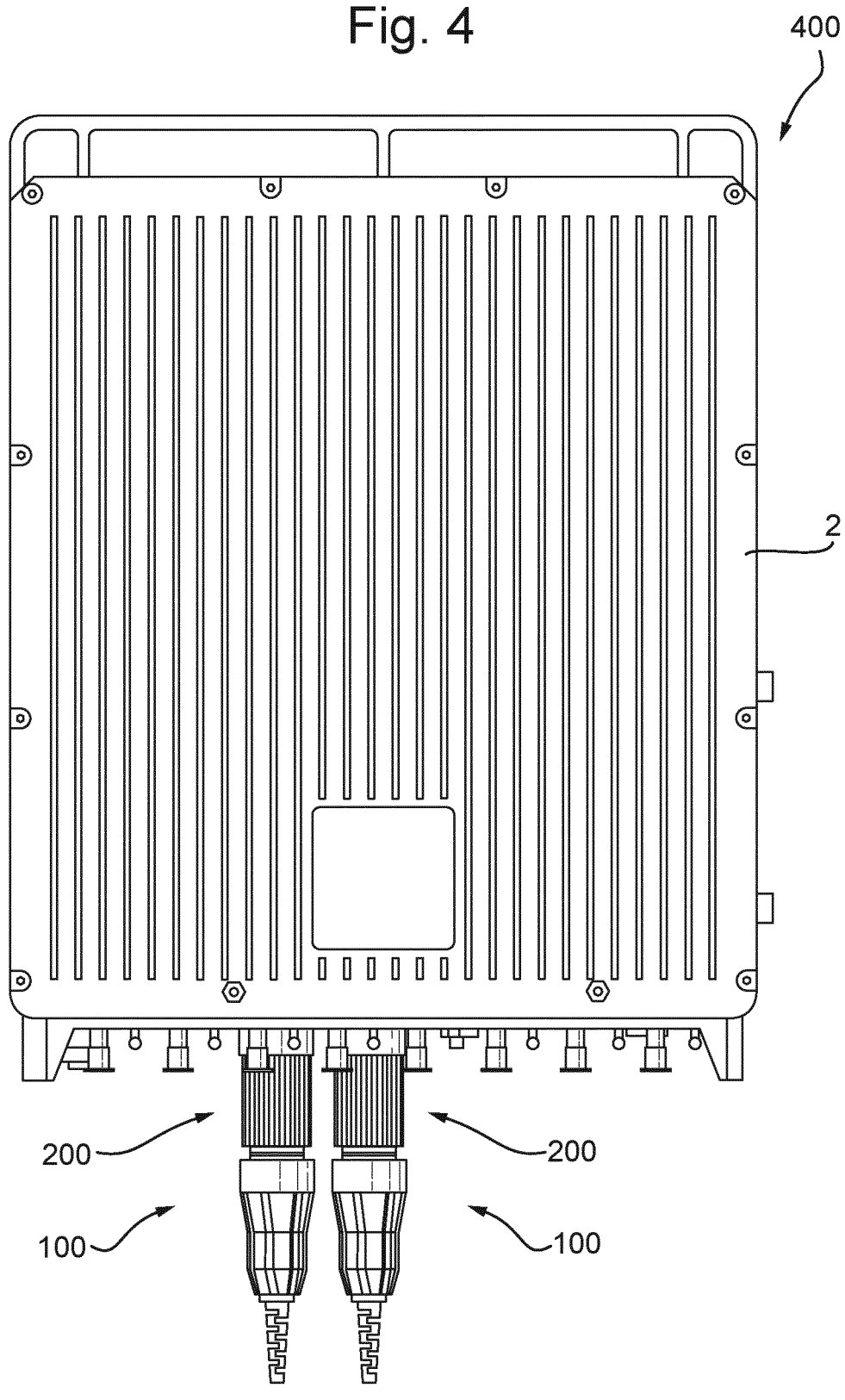
FIG. 4 is a top view of a system comprising the radio unit and heat dissipater assembly, according to arrangements of the present disclosure.

Referring now to FIGS. 3 and 4, the second connector portion 230 may be configured to couple to the radio unit 2. The shape of the second connector portion 230 may correspond to the shape of the optical connector 130 that is connectable to the first connector portion 220. Accordingly, the second connector portion 230 may be configured to couple to a connector 2a on the radio unit 2 to which the optical connector 130 could be connected. The second connector portion 230 may be for example AXS connector compatible towards the radio unit 2. As shown in FIG. 3, the connector 2a on the radio unit 2 may be provided at a plug/socket 2b for receiving a pluggable optical module, e.g. similar to the optical module 120 receivable within the recess 212. As described above, the second connector portion 230 may be coupled to the heat dissipater 200 at an end, e.g. the second end 210b, of the dissipater body. Accordingly, at least a portion of the dissipater body 210, e.g. at the first end 210a of the dissipater body, is spaced apart from the radio unit 2 when the second connector portion 230 is coupled to the radio unit 2. A length of the heat dissipater 200, e.g. the dissipater body 210, may be greater than a length of the optical module 120. Furthermore, at least a portion of the optical module 120 may be housed within the portion of the dissipater body 210 spaced apart from the radio unit 2.

Figure 5:
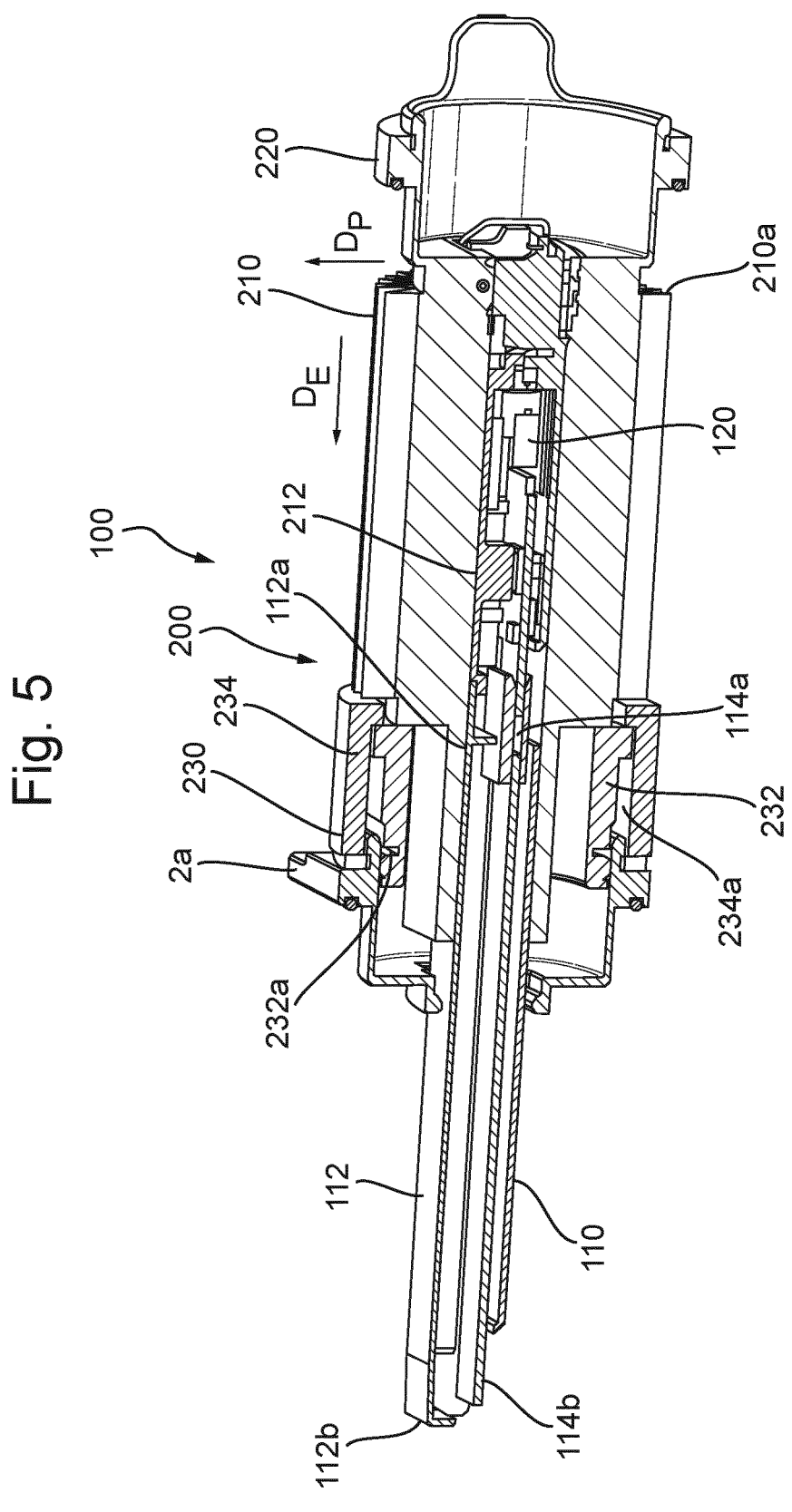
FIGS. 5 and 6 are cross-sectional views of the heat dissipater assembly, shown in FIGS. 2a and 2b, in planes perpendicular to one another.

With reference to FIG. 5, the electrical extender 110 may comprise a housing 112, one or more first electrical terminals 114a provided at a first end 112a of the housing, and one or more second electrical terminals 114b provided at a second end 112b of the housing opposite the first end. The electrical extender 110 further comprises one or more connectors extending between the first and second ends of the housing for electrically connecting the first electrical terminals 114a to respective ones of the second electrical terminals 114b.

The electrical extender 110 is configured to be partially received within the heat dissipater 200, e.g. within the dissipater body 210. As shown in FIG. 5, the first end 112a of the electrical extender housing may be receivable within the heat dissipater 200. The electrical extender 110 is configured to electrically connect to the optical module 120 housed within the recess 212 in the dissipater body, when the electrical extender 110 is received within the heat dissipater 200. In particular, the one or more first electrical terminals 114a may be configured to electrically connect to respective electrical terminals of the optical module housed in the recess 212.

Returning briefly to FIG. 3, the second end 112b of the electrical extender housing may project from the heat dissipater 200, e.g. from the dissipater body 210. A length of the electrical extender, e.g. of the housing 112, may be such that the second end 112b can be received within the plug/socket 2b of the radio unit 2 when the second connector portion 230 is connected to the radio unit connector 2a. The electrical extender 110 may be referred to as a pluggable extender. Furthermore, a part of the electrical extender 110 protruding from the heat dissipater 200 may be configured, e.g. shaped, to be received within the radio unit 2, e.g. within the plug/socket 2b of the radio unit 2 for receiving a pluggable optical module. For example, a shape of part of the electrical extender 110, e.g. the part of the electrical extender 110 protruding from the heat dissipater 200, such as the second end 112b of the housing 112, may correspond to a shape of the optical module 120 received within the recess 212 in the dissipater body 210. As mentioned above, the one or more second electrical terminals 114b may be provided at the second end 112b of the housing 112. In this way, the electrical extender 110 may be configured to electrically connect the optical module 120 within the recess 212 to the radio unit 2. In particular, the electrical extender 110 may connect the optical module 120 to the radio unit 2 by forming the same electrical connections between the optical module and the radio unit 2 that are present when the optical module 120 is connected directly to the radio unit 2, e.g. plugged into the plug/socket 2b in the radio unit 2. Connection between the optical module 120 and the radio unit 2 may thereby be achieved whilst the optical module is positioned outside of the radio unit 2.

As depicted in FIG. 5, the second connector portion 230 may comprise a fixed portion 232 and a movable portion 234, movable relative to the fixed portion 232. The fixed portion 232 may be coupled to, e.g. fixedly coupled to or integrally formed with, the dissipater body 210 and, therefore, the movable portion 234 may be movable relative to the dissipater body 210. In the arrangement depicted, the movable portion 234 is rotatable relative to the fixed portion 232 and the dissipater body 210. The movable portion 234 may form a collar disposed about the fixed portion 232 of the second connector portion 230.

The movable portion 234 of the second connector portion 230 may comprise one or more engagement features 234a and, referring to briefly back to FIG. 3, the radio unit 2 may comprise one or more complimentary engagement features 2c. The complementary engagement features 2c may be provided on or adjacent to the connector 2a. The engagement features 234a on the movable portion of the second connector portion 230 may be configured to selectively engage the complementary engagement features 2c on the radio unit 2. For example, moving the movable portion 234 relative to the fixed portion 232, when the second connector portion 230 is connected to the radio unit 2, e.g. to the connector 2a on the radio unit 2, may cause the engagement features 234a to engage, or disengage from, the complementary engagement features 2c. Engagement between the engagement features 234a and complementary engagement features 2c may act to prevent or resist disconnection of the heat dissipater assembly 100, e.g. the second connector portion 230, from the radio unit connector 2a The movable portion 234 of the second connector portion 230 may comprise a metallic material or a plastic material. In either case, the movable portion may comprise an electromagnetic interference shielding material.

The second connector portion 230 may further comprise a seal element 232a. The seal element 232a may be mounted on the fixed portion 232 of the second connector portion 230. The seal element 232a may be configured, e.g. positioned and/or shaped, to contact the radio unit 2, e.g. the connector 2a of the radio unit 2, when the second connector portion 230 is coupled to the radio unit 2 in order to create a seal between the radio unit 2 and the heat dissipater 200. The seal may be to prevent or reduce the ingress of water and dust or debris into the heat dissipater 200 or radio unit 2, e.g. into the recess 212 in the dissipater body 210 or the plug/socket 2b of the radio unit 2. In some arrangements, the seal element 232a may be manufactured from or comprise an electromagnetic interface shielding material. Engagement between the engagement features 234a and complementary engagement features 2c may act to prevent or resist separation of the seal element 232a from the radio unit 2.

Figure 6:
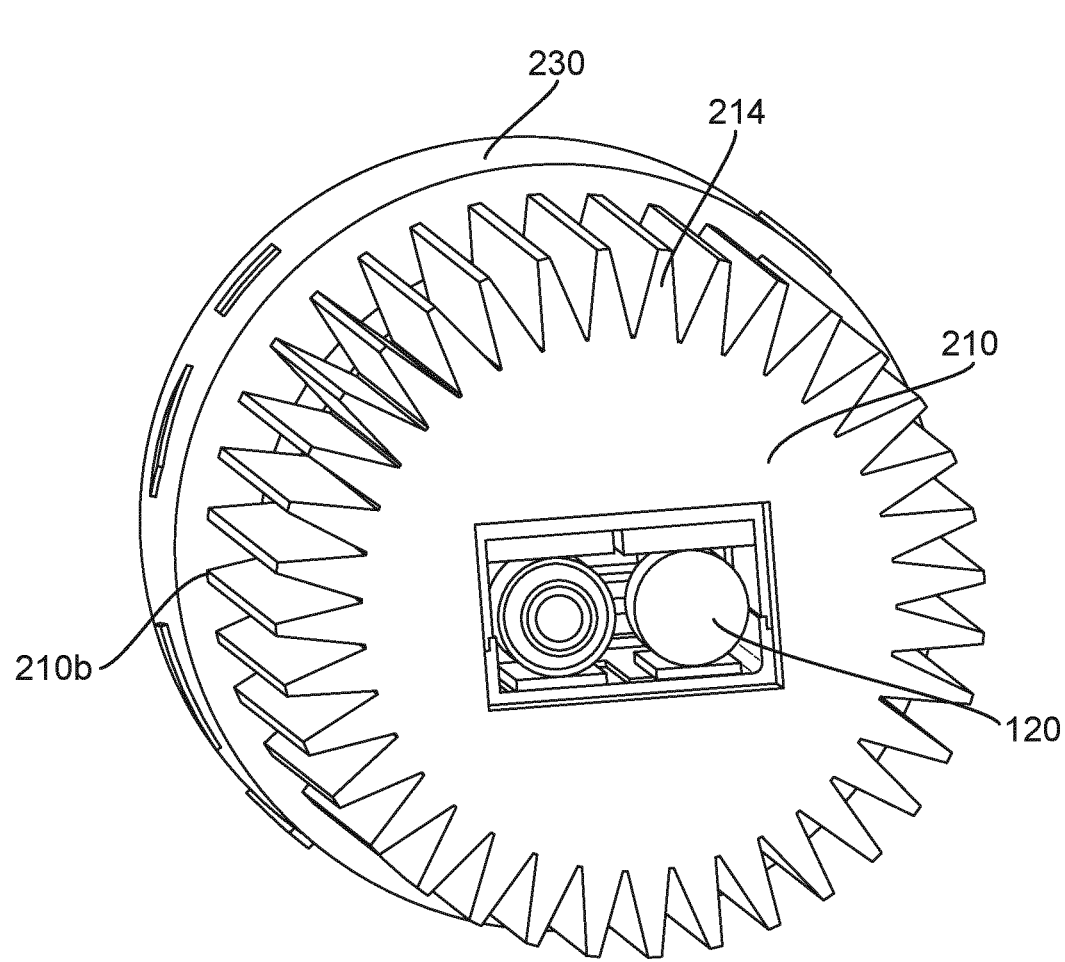

Referring now to FIGS. 5 and 6, the one or more heat dissipation structures 214 may be provided on an external surface of the dissipater body 210. This portion of the heat dissipator assembly 100 may be referred to as a heat sink. The heat dissipation structures 214 may be configured to increase a rate of heat dissipation from the dissipater body 210 compared to if the heat dissipation structures 214 were not present. For example, the heat dissipation structures 214 may be configured to increase a surface area of the heat dissipater 200 available to dissipate heat into the environment around the heat dissipater 200. It should be appreciated that various forms of the heat dissipation structures 214 are possible.

In the arrangement depicted, the heat dissipation structures 214 are manufactured from the same material as the rest of the dissipater body 210. For example, the dissipater body, including the heat dissipation structures 214 may comprises, e.g. be manufactured from, a thermally conductive material, such as a thermally conductive plastic or a metal material, such as aluminium. In other arrangements, portions of the dissipater body 210 may comprise a (relatively) thermally insulating material, such as a plastic material, and the heat dissipation structures 214 may comprise a (relatively) thermally conductive material, such as a metal material, e.g. aluminium. At least a part of the recess 212 may be formed in one or more portions of the comprising the thermally insulating material. In such arrangements, the heat dissipation structures 214 may extend from the recess 212 in the dissipater body 210 to the external surface of the dissipater body 210. In each of the arrangements, a material of the dissipater body 210 may be selected to provide electromagnetic interference shielding around the optical module 120.

In one or more arrangements, the heat dissipation structures 214 may comprise a plurality of heat dissipation fins arrayed, e.g. spaced apart from one another over, regularly or irregularly the external surface of the dissipater body 210. As depicted in FIG. 6, the heat dissipation fins may be substantially triangular in cross-section and may have rounded and/or square distal ends. In other arrangements, the heat dissipation fins may be any other shape in cross-section, such as rectangular.

The heat dissipation structures 214 may extend principally in an extension direction $D_E$ having a component parallel with the longitudinal axis 210c of the dissipater body 210. As depicted, the heat dissipation structures 214, e.g. each of the heat dissipation structures 214, may extend in the extension direction $D_E$ a distance substantially equal to the length of the dissipater body 210 in the extension direction. Alternatively, the heat dissipation structures 214 may be arrayed in the extension direction, such that two or more of the heat dissipation structures 214 are spaced apart from one another over the external surface of the dissipater body 210 in the extension direction $D_E$.

The heat dissipation structures 214 may be arrayed about the longitudinal axis 210c of the dissipater body. As depicted in FIG. 4, the heat dissipation structures 214 may be arrayed through an angle of greater than 180 degrees, such as substantially 360 degrees about the longitudinal axis of the dissipater body 210.

As illustrated in FIGS. 2 to 6, the dissipater body 210 may be substantially cylindrical. The longitudinal axis 210c of the dissipater body 210 may correspond to a central axis of the cylindrical shape of the dissipater body 210. In such arrangements, the heat dissipation structures 214 may project outwardly in a radial direction relative to the central axis of the dissipater body 210. In other arrangements, the dissipater body 210 may be any other shape. For example, the dissipater body 210 may be shaped substantially as a square, rectangular, triangular or oval prism. In such arrangements, the heat dissipation structures 214 may project outwardly in respective directions that are perpendicular to adjacent portions of the external surface of the dissipater body 210, e.g. where another heat dissipation structure is not provided.

Projection lengths of the heat dissipation structures 214 between the proximal and distal ends of the heat dissipation structures 214 in respective projection directions $D_P$ of the heat dissipation structures 214 may be greater than widths of the heat dissipation structures 214 in respective width directions perpendicular to projection directions $D_P$ and the extension direction $D_E$.

In other arrangements, the heat dissipation structures 214 may be shaped and arranged over the external surface of the dissipater body 210 in any other desirable manner.

The dissipater body 210 may be configured to contact the optical module 120 received in the recess 212, e.g. so as to be in thermal communication with the optical module, at a plurality of locations spaced around the longitudinal axis 210c of the dissipater body 210 through an angle of greater than 90 degrees or greater than 180 degrees, such as at a plurality of location spaced apart through an angle of substantially 360 degrees about the longitudinal axis. For example, the recess 212 may comprise two or more internal walls arranged at angles relative to one another. The dissipater body 210 may be configured to contact the optical module received in the recess 212 at two or more of the internal walls, e.g. so as to be in thermal communication with the optical module at two or more of the internal walls.

The two or more internal walls of the recess 212 may correspond in shape to two or more external walls of the optical module to be received within the recess 212. For example, the recess 212 may comprise 3, 4 or more than 4 internal walls arranged at angles relative to one another, e.g. to define a cross-sectional shape of the recess 212 substantially corresponding to a cross-sectional shape of the optical module to be received within the recess 212. As can be seen in FIG. 6, the optical module 120 may be substantially rectangular in cross-section. However, in other arrangements, the optical module 120 may have any other cross-sectional shape and the recess 212 may be shaped similarly.

The recess 212 may be configured such that each of the internal walls of the recess 212 is in contact, e.g. thermal communication, with a corresponding external wall of the optical module 120 when the optical module is received within the recess 212. In this way, heat may be dissipated from the optical module to each of the internal walls of the recess 212 and therefore at each of the corresponding external walls of the optical module.

Figure 7:
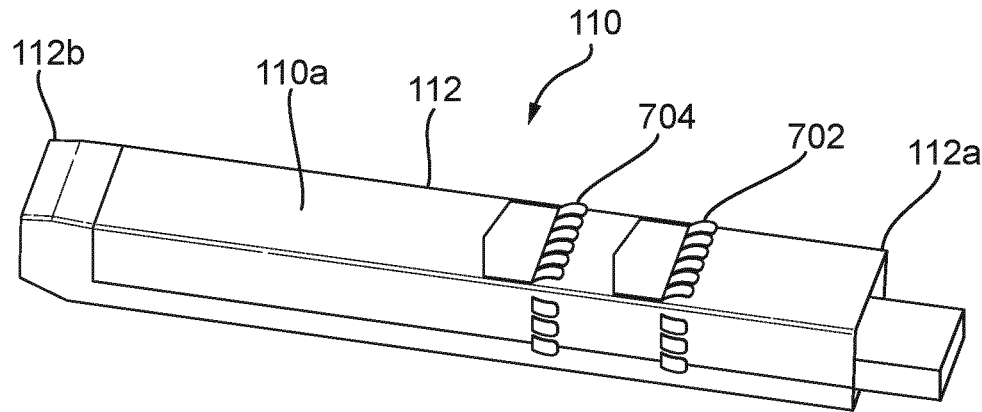
FIG. 7 is a perspective view of an electrical extender for the heat dissipater assembly according to arrangements of the present disclosure.
Figure 8:
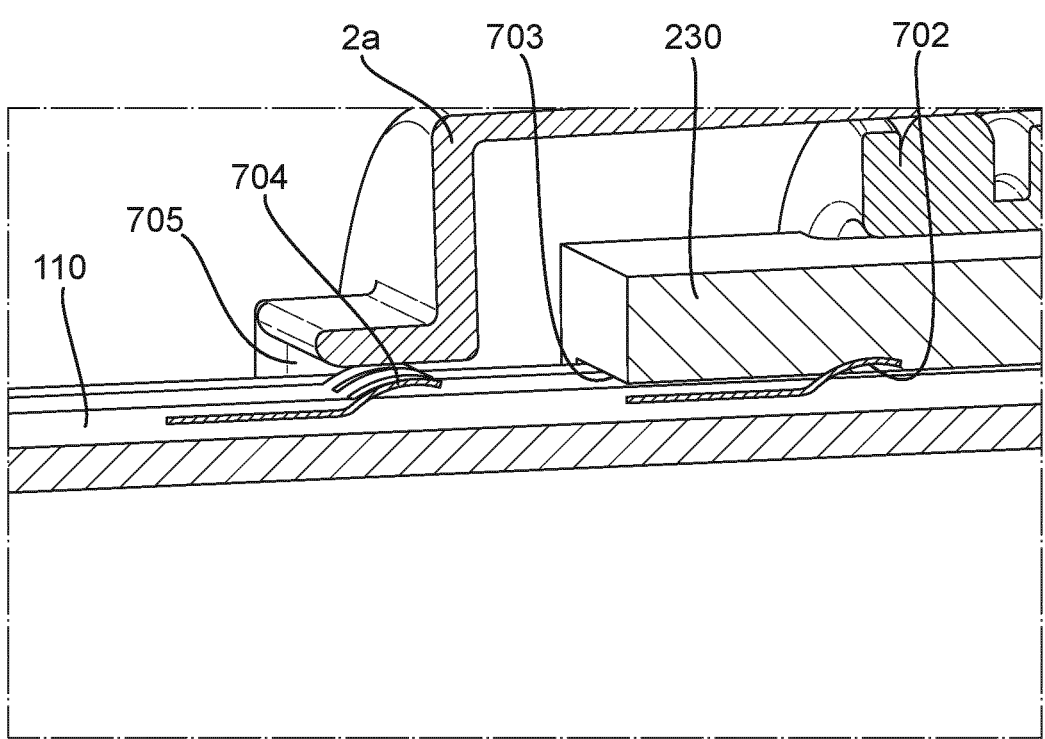
FIG. 8 is a partial, cross-sectional view illustrating the electrical extender shown in FIG. 7 installed within the heat dissipater assembly and a radio unit connector.

With reference to FIGS. 7 and 8, the electrical extender 110 may comprise a plurality of first contact elements 702 spaced over an external surface 110a of the electrical extender. The first contact elements 702 may be arranged so as to contact the heat dissipater 200, e.g. the dissipater body 210 or second connector portion 230, at an opening 703 in the heat dissipater 200 in which the electrical extender 110 is received, e.g. in order to electrically connect to the optical module 120 received within the recess 212. The first contact elements 702 may be arranged so as to contact the heat dissipater 200 at a plurality of positions spaced around the opening 703. The first contact elements 702 may be electrically connected to the housing 112 of the electrical extender. In this way, the first contact elements 702 may improve electromagnetic shielding at the opening 703.

The first contact elements 702 may be resiliently biased in an outward direction relative to the external surface 110a of the electrical extender 110 and may therefore be biased against the inside of the opening 703 in the heat dissipater 200, when the electrical extender 110 is received within the heat dissipater 200.

The electrical extender 110 may further comprises a plurality of second contact elements 704. As depicted, the second contact elements may be spaced apart from the first contact elements 702 along a length of the electrical extender 110, so that the second contact elements 704 are closer to the second end 112b of the housing than the first contact elements 702. The second contact elements 704 may be positioned on the portion of the electrical extender 110 which protruded from the heat dissipater 200, e.g. the dissipater body 210, when the electrical extender 110 is electrically connector to the optical module 120 housed within the recess 212.

The second contact elements 704 may be arranged so as to contact the radio unit 2, e.g. the connector 2a, at an opening 705 in the radio unit 2 in which the electrical extender 110 is received, e.g. when the part of the electrical extender 110 protruding from the heat dissipater 200 is received within the plug/socket 2b on the radio 2.

The second contact elements 704 may be arranged so as to contact the radio unit 2 at a plurality of positions spaced around the opening 705. The second contact elements 704 may be electrically connected to the housing 112 of the electrical extender. In this way, the second contact elements 704 may improve electromagnetic shielding at the opening.

The second contact elements 704 may be resiliently biased in an outward direction relative to the external surface 110a of the electrical extender 110 and may therefore be biased against the inside of the opening 705 into the radio unit 2, when the electrical extender 110 is received within the radio unit 2.

Returning briefly to FIG. 4, a system 400, e.g. a radio system, such as a remote radio system may comprise a telecommunications unit in the form of a radio unit, such as the remote radio unit 2, and one or more of the heat dissipater assemblies 100. The system 400 may further comprise one or more optical modules 120 receivable within the recesses 212 in the heat dissipater assemblies. In some arrangements, the system 400 may further comprise one or more optical connectors 130 respectively coupled to the heat dissipater assemblies, e.g. the first connector portion 220 of the heat dissipaters 200.

As illustrated, the radio unit 2 may comprise a plurality of the connectors 2a. The heat dissipater assemblies 100, may be connectable to respective ones of the plurality of connectors 2a.

In the above examples the telecommunications unit is in the form of a radio unit. However, as noted above, it should be appreciated that the telecommunications unit may be any other type of telecommunications unit, such as, but not limited to, a router.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention claimed is:

1. A heat dissipater assembly for an optical module for a telecommunications unit, the heat dissipater assembly comprising:

a heat dissipater, the heat dissipater comprising:

a dissipater body comprising a recess for receiving the optical module such that the optical module is in thermal communication with the dissipater body, and one or more heat dissipation structures configured to dissipate heat from the optical module into an environment around the heat dissipater;

a first connector portion coupled to the dissipater body, the first connector portion being configured to couple to an optical connector such that the optical connector is optically connected to the optical module when the optical module is received within the recess; and a second connector portion coupled to the dissipater body, the second connector portion couplable to the telecommunications unit, a shape of the second connector portion corresponding to a shape of the optical connector connectable to the first connector portion; and an electrical extender, the electrical extender being configured to be partially received within the heat dissipater and electrically connect to the optical module when the optical module is received within the heat dissipater, and the electrical extender being configured to electrically connect to the telecommunications unit when the second connector portion is coupled to the telecommunications unit.

2. The heat dissipater assembly of claim 1, wherein a part of the electrical extender protrudes from the heat dissipater to electrically connect to the telecommunications unit away from the heat dissipater.

3. The heat dissipater assembly of claim 1, wherein heat dissipater assembly is configured such that at least a portion of dissipater body is spaced apart from the telecommunications unit when the second connector portion is coupled to the telecommunications unit.

4. The heat dissipater assembly of claim 1, wherein the heat dissipation structures comprise a plurality of heat dissipation fins arrayed over an external surface of the dissipater body.

5. The heat dissipater assembly of claim 1, wherein the first connector portion is at a first end of the dissipater body and the second connector portion is at a second end of the dissipater body, wherein a longitudinal axis of the dissipater body extends between the first and second ends, and wherein the heat dissipation structures are arrayed about the longitudinal axis.

6. The heat dissipater assembly of claim 5, wherein the dissipater body is substantially cylindrical.

7. The heat dissipater assembly of claim 5, wherein the dissipation structures are arrayed about the longitudinal axis of the dissipater body through an angle of substantially 360 degrees.

8. The heat dissipater assembly of claim 5, wherein the dissipater body is configured to contact the optical module received in the recess at a plurality of locations spaced around the longitudinal axis of the dissipater body through an angle of greater than 90 degrees.

9. The heat dissipater assembly of claim 1, wherein the recess comprises two or more internal walls arranged at angles relative to one another, wherein the dissipater body is configured to contact the optical module received in the recess at two or more of the internal walls.

10. The heat dissipater assembly of claim 1, wherein the second connector portion comprises one or more engagement features configured to selectively engage one or more complimentary engagement features on the telecommunications unit to resist disconnection of the second connector portion from the telecommunications unit.

11. The heat dissipater assembly of claim 10, wherein the one or more engagement features are formed on a collar movably coupled to a fixed portion of the second connector portion, wherein the collar is movable relative to the fixed portion in order to engage or disengage the one or more engagement features from the one or more complimentary engagement features.

12. The heat dissipater assembly of claim 1, wherein the second connector portion comprises a seal configured to engage the telecommunications unit to create a seal against the ingress of water and/or dust between the telecommunications unit and the heat dissipater.

13. The heat dissipater assembly of claim 12, wherein the second connector portion is configured such that engagement of the one or more engagement features with the one or more complementary engagement features acts to resist the seal disengaging from the telecommunications unit.

14. The heat dissipater assembly of claim 12, wherein the seal comprises an electromagnetic interference shielding material.

15. The heat dissipater assembly of claim 1, wherein the electrical extender comprises a plurality of first contact elements spaced over an external surface of the electrical extender, wherein the first contact elements are configured to engage the heat dissipater at a plurality of positions around an opening in the heat dissipater in which the electrical extender is received, in order to improve electromagnetic interference shielding at the opening.

16. The heat dissipater assembly of claim 1, wherein the electrical extender comprises a plurality of second contact elements spaced over an external surface of the electrical extender, wherein the second contact elements are configured to engage the telecommunications unit at a plurality of positions around an opening in the telecommunications unit in which the electrical extender is received when the second connector portion is coupled to the telecommunications unit, in order to improve electromagnetic interference shielding at the opening in the telecommunications unit.

17. The heat dissipater assembly of claim 1, wherein a shape of a portion of the electrical extender configured to electrically connect to the telecommunications unit corresponds to a shape of a portion of the optical module to be received within the recess.

18. The heat dissipater assembly of claim 1, wherein a length of the heat dissipater is greater than a length of the optical module.

19. The heat dissipater assembly of claim 1, wherein the dissipater body is manufactured from a thermally conductive material.

20. The heat dissipater assembly of claim 1, wherein the recess of the heat dissipater body is at least partially formed in one or more portions of the heat dissipater body manufactured from a thermally insulating material, and wherein the heat dissipation structures comprise thermally conductive elements coupled to the one or more portions manufactured from the thermally insulating material.

21. The heat dissipater assembly of claim 1, wherein the telecommunications unit is a radio unit.

22. A heat dissipater for a heat dissipater assembly of an optical module for a telecommunications unit, the heat dissipater comprising:

a dissipater body comprising a recess for receiving the optical module, such that the optical module is in thermal communication with the dissipater body, and one or more heat dissipation structures configured to dissipate heat from the optical module into an environment around the heat dissipater;

a first connector portion coupled to the dissipater body, wherein the first connector portion is configured to couple to an optical connector, such that the optical connector is optically connected to the optical module when the optical module is received within the recess; and a second connector portion coupled to the dissipater body, the second connector portion couplable to the telecommunications unit, a shape of the second connector portion corresponding to a shape of the optical connector connectable to the first connector portion.

23. The heat dissipater of claim 22, wherein the telecommunications unit is a radio unit.

24. A system comprising:

a telecommunications unit; and one or more of the heat dissipater assemblies coupled to the telecommunications unit, each of the one or more heat dissipater assemblies comprising:

a heat dissipater, the heat dissipater comprising:

a dissipater body comprising a recess for receiving the optical module such that the optical module is in thermal communication with the dissipater body, and one or more heat dissipation structures configured to dissipate heat from the optical module into an environment around the heat dissipater;

a first connector portion coupled to the dissipater body, the first connector portion being configured to couple to an optical connector such that the optical connector is optically connected to the optical module when the optical module is received within the recess; and a second connector portion coupled to the dissipater body, the second connector portion couplable to the telecommunications unit, a shape of the second connector portion corresponding to a shape of the optical connector connectable to the first connector portion; and an electrical extender, the electrical extender being configured to be partially received within the heat dissipater and electrically connect to the optical module when the optical module is received within the heat dissipater, and the electrical extender being configured to electrically connect to the telecommunications unit when the second connector portion is coupled to the telecommunications unit.

25. The system of claim 24, further comprising one or more optical modules respectively received within the recesses of the one or more heat dissipater assemblies.

26. The system of claim 24, wherein the telecommunications unit is a radio unit.

* * * * *